United States Patent [19]
Lott

[11] Patent Number: 6,024,874
[45] Date of Patent: Feb. 15, 2000

[54] HYDROCYCLONE SEPARATOR

[76] Inventor: W. Gerald Lott, 1857 Post Oak Park Dr., Houston, Tex. 77027

[21] Appl. No.: 09/185,273

[22] Filed: Nov. 3, 1998

[51] Int. Cl.⁷ .................................................. B01D 21/26
[52] U.S. Cl. ..................... 210/512.1; 210/788; 55/459.1; 55/459.3; 55/454.4; 209/138; 209/718; 209/720; 209/721; 209/732; 209/733
[58] Field of Search ............................... 55/459.1, 459.2, 55/459.3, 459.4, 459.5; 204/138, 718, 720, 721, 732, 733; 210/512.1, 788

[56] References Cited

U.S. PATENT DOCUMENTS

| | | |
|---|---|---|
| 3,105,044 | 9/1963 | Troland . |
| 3,232,430 | 2/1966 | Saint-Jacques . |
| 3,568,847 | 3/1971 | Carr . |
| 4,824,449 | 4/1989 | Majoros . |
| 5,771,922 | 6/1998 | Fisher . |

*Primary Examiner*—David A. Reifsnyder
*Attorney, Agent, or Firm*—Browing Bushman

[57] ABSTRACT

A hydrocyclone separator (10) has an outer housing (12) including an upper housing portion (14) and a lower housing portion (16). Upper housing portion (14) has a cylindrical chamber (22) and an involuted entrance (20) to cylindrical chamber (22). A vortex finder tube (24) has a flaring lower end portion (29). A solid core (34) is mounted within finder tube (24) and extends downwardly from finder tube (24) a distance at least equal to 1½% times the inner diameter of the entrance orifice or opening (30) of finder tube (24). The outer peripheral surface (40) of solid core (34) tapers downwardly and is generally parallel to the inner peripheral surface (44) of lower tapered chamber (46). A strong interface (48) is formed between the downwardly extending outer vortex and the upwardly extending inner vortex with minimal turbulence and intermingling of particles between the inner and outer vortices.

14 Claims, 3 Drawing Sheets

HYDROCYCLONE SEPARATOR

BACKGROUND OF THE INVENTION

1. Field of the Invention

This invention relates to a hydrocyclone separator, and more particularly to such a separator in which a solid core is positioned within the entrance of a vortex finder tube.

2. Background of the Invention

Hydrocyclone separators are fixed wall centrifugal density separators. The body is stationary and rotation is initiated by the pressurized fluid flow. Hydrocyclone separators utilize fluid pressure energy to generate rotational fluid motion. This rotational motion causes relative movement of suspended materials or particles in the fluid, permitting separation of these materials. The influence of centrifugal force moves the more dense particles outwardly toward the wall of the separator while the less dense particles move radially inward with the dominant liquid medium.

Hydrocyclone separators generally have a tangential feed inlet that is perpendicular to two opposed vertical axial outlets; one at the bottom end of the separator and the other at the upper end of the separator. The lower outlet is for dense components of the fluid. The outlet at the top of the hydrocyclone separator includes a tube that extends downwardly into the main central chamber of the separator and is referred to as a vortex finder tube. The vortex finder tube functions as the outlet for the separated and relatively clean liquid accompanied with the light gravity components of the fluid.

The sharpness of separation in hydrocyclone separators heretofore has been relatively low in efficiency, because of the intermixing of coarse particles with fine particles in the fluid or slurry during the separation process. This intermixing results from the flow characteristics in hydrocyclone separators which includes an outer vortex or helical flow and an inner vortex or helical flow. The outer helical flow is caused by the rotation of the fluid that generates the centrifugal force to move the more dense particles toward the outside wall of the hydrocyclone separator. The inner helical flow is created when all of the spinning fluid can not exit the relatively small orifice in the bottom outlet. The inability of all the fluid to exit at the bottom outlet causes a reversal flow creating an air core. The air core accelerates the inward generally radial movement of the lighter particles and the liquid phase of the fluid or slurry located along the central longitudinal axis of the separator.

The hydrocyclone separator may be positioned in either a horizontal or vertical position and the central axis may extend horizontally or vertically. The terms "upper" and "lower" are interpreted as including the opposed ends of the separator when the longitudinal axis of the separator extends in a horizontal direction or direction other than a vertical direction.

The amount of radial movement or migration of particles increases as the cross-sectional area of the central chamber decreases toward the lower end of the separator. Since all of the slurry (fluid having entrained solid particles) cannot exit the relatively small lower orifice, the fluid reverses its downward velocity direction and spins upwardly in an inner helical flow for discharge from the upper end of the vortex finder tube. The reversal applies only to the vertical component of velocity and the helical flows rotate in the same circular direction.

In the inner helical flow, a short-circuit flow often develops. It is well known to those skilled in the art that some of the inlet slurry moves along the internal roof or upper wall surface, down the outside wall of the vortex finder, and out the lower outlet without the components being separated. This is known as "short-circuit flow" or leakage. The short-circuit flow also influences some coarse particles directly into the overflow for discharge from the upper outlet without any separation. This indicates that reducing (or even eliminating) the short-circuit flow is beneficial to improving the sharpness of separation of the inner and outer vortices in a hydrocyclone. In addition, because of the existence of turbulence in a conventional hydrocyclone, and fluid flow along the peripheral surface defining the main chamber, some fine particles are retained in the underflow for discharge from the lower outlet, resulting in a drop in the separation sharpness.

Recent experimental research on the motion of solid particles in a hydrocyclone has shown that some light gravity particles in the inner helical flow move towards the outer peripheral surface in the cylindrical section. Indications are that some coarser particles are drawn toward the inner helical flow or vortex. The short-circuit flow can be as much as 15% of the processed flow rate that enters the vortex finder tube without separation. Expediting the centrifugal settlement of the particles in the inner helical flow in the cylindrical section is beneficial to improving the sharpness of separation between the inner and outer vortices.

To achieve a state of smooth flow in the hydrocyclone, the incoming feed should not collide with the circulating flow. In a straight tangential feed inlet, the inlet feed meets the circulating flow, generating turbulence in a critical region of separation.

In hydrocyclone classification, the interface between the outer and inner helical flows is often unstable because of a fluctuating air core. An unstable and fluctuating air core, much like the movement of a tornado, influences the intermingling of multi-density particles. This instability causes some of the more dense particles to be drawn into the inner helical flow and exit out the upper outlet defined by the vortex finder tube with the majority of the light gravity solids and some of the lighter particles migrating to the outer helical flow for discharge from the lower outlet thus attributing to an inefficient separation sharpness.

U.S. Pat. No. 3,105,044 dated Sep. 24, 1963 shows a hydrocyclone separator in which a solid core is positioned within the entrance of a vortex finder tube. A hollow inner vortex is formed with the diameter of the vortex dependent primarily on the rotational speed of the liquid mass, the pressure loss, and the diameter of the vortex finder tube orifice. The solid core has a diameter that is greater than the diameter of the hollow vortex or air core. An embodiment of the separator of U.S. Pat. No. 3,105,044 shown in FIG. 3 has a solid core with a diameter that constantly increases from its upper end to its lower end while the vortex finder tube tapers in a downward direction.

SUMMARY OF THE INVENTION

The hydrocyclone separator comprising the present invention has an involuted entrance and the inlet fluid from the entrance gradually merges with the rotating fluid or slurry within the generally cylindrical chamber without any substantial turbulence. A smooth streamline rotational movement is provided without any collision between the incoming flow and the rotating slurry. The involute inlet to the cylindrical section establishes a strong uniform vortex. The separator has an outer body or housing with a vortex finder tube mounted centrally within the body and having a outwardly flaring bell-shaped entrance orifice for the upwardly moving vortex. The body defines an upper cylindrical section adjacent the inlet and receiving the vortex finder tube. A lower body portion has a smooth inner peripheral surface sloping or tapering downwardly from the upper cylindrical section to a lower or bottom outlet for the heavier or coarse solid particles. The slope to the interior wall or periphery of the housing is smooth and provides a gentle transition that improves the flow characteristics of the slurry by reducing turbulence.

A solid elongate core is mounted axially within the flared entrance or orifice of the vortex finder tube and extends downwardly from the orifice of the vortex finder tube into the tapered housing chamber a distance at least 1½% times the inner diameter of the entrance orifice. The tapered outer peripheral surface of the solid core is parallel to the inner peripheral surface of the tapered outer housing and this tends to stabilize the upwardly moving inner vortex. The solid core replaces the central air core for stabilizing the inner vortex and a relatively long length solid core is desired. An annulus defined between the core and body has a uniform radial spacing. The stabilization of the inner vortex provides a strong and definitive interface between the inner and outer vortices. The strong interface minimizes turbulence and the intermingling of light gravity solids and heavier gravity solids.

The vortex finder tube is circular at the top and gradually increases in diameter to terminate into a bell-shaped entrance for the fluid flow of the inner vortex. The bell-shaped lower end of the finder tube increases the velocity of the slurry acting as an accelerator to the slurry to minimize short-circuiting or leakage.

The solid core of the separator permits a "free vortex". The air core in a conventional hydrocyclone has an unsteady motion similar to a tornado. This fluctuating movement disturbs the streamline flow pattern established between the inner helical flow and the outer helical flow. The axial motion disturbance influences the intermingling of multi-density particles at the interface of the two helical flows.

The solid core appears to increase the tangential velocity while reducing the radial velocity. This is attributed to a boundary layer development around the solid core that will rapidly reduce the radial velocity until a zero value is reached. This rapid reduction in radial velocity concentrates the fine particles in the inner helical flow and enhances the separation process.

An object of this invention is the provision of a hydrocyclone separator in which a solid core is positioned within a vortex finder tube to define a strong interface between the inner and outer vortices to minimize turbulence.

A further object of the invention is to provide such a hydrocyclone separator in which an involuted entrance to the generally cylindrical entrance chamber is provided to minimize any turbulence.

Other features and advantages of the invention will be apparent from the following specification and drawings.

Figure 2:
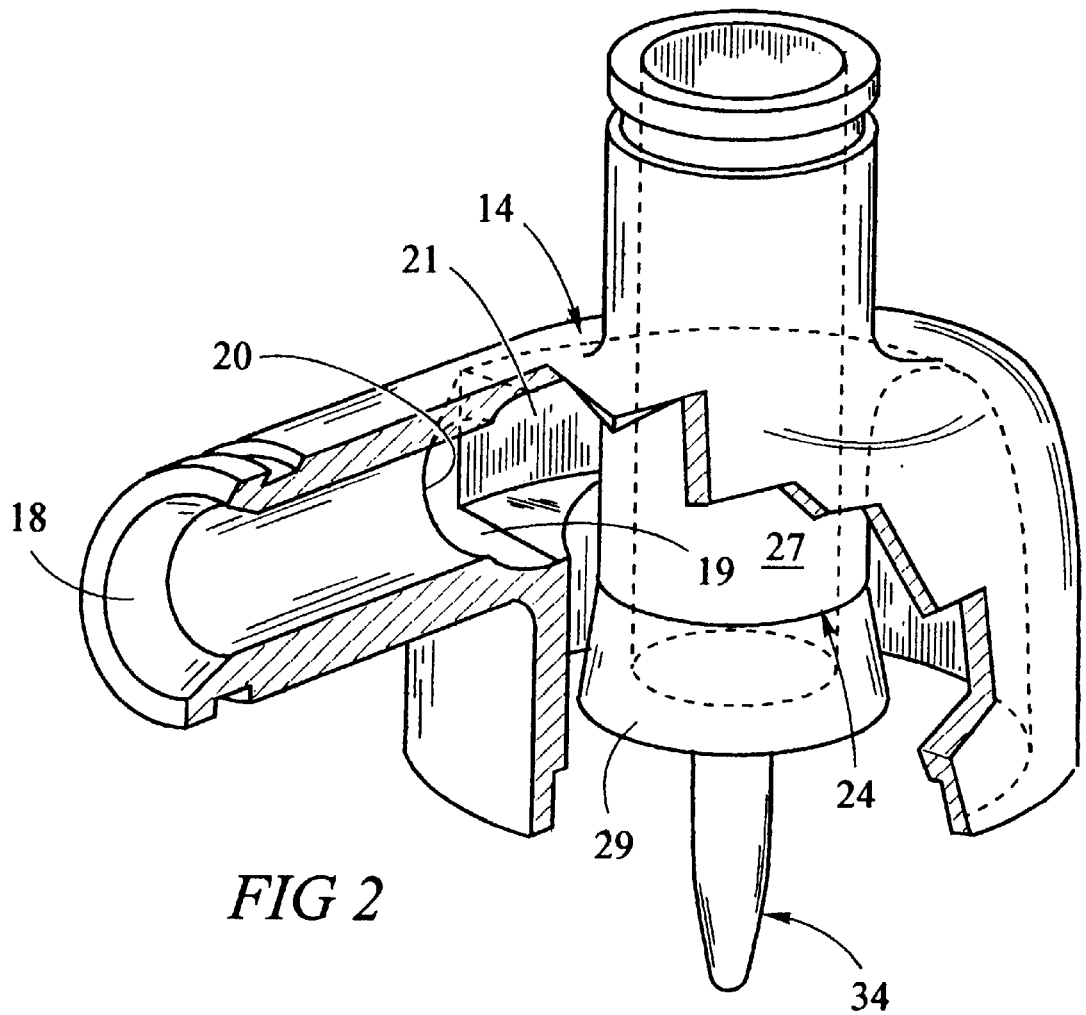
FIG. 2 is a perspective with certain parts broken away of the upper body portion and showing a transition from a circular cross sectional area of the inlet to a rectangular cross sectional area.

Referring to the drawings for a better understanding of the invention, a hydrocyclone separator is shown generally at 10 having a two piece body or housing 12. Housing 12 includes an upper body portion 14 and a lower body portion 16 secured to each other in threaded relation at 15. Upper body portion 14 has an inlet 18 and an involuted entrance 20 to an upper cylindrical chamber 22 having an arcuate outer wall 21. Inlet 18 is of a circular cross section and merges with entrance 20 of a generally rectangular cross section as shown in FIG. 2 adjacent transition section 19. A thin uniform layer of the slurry is formed at the transition section 19 between the circular cross section and the rectangular cross section. A rotating fluid movement of the slurry in cylindrical chamber 22 is converted into centrifugal force without any appreciable turbulence or flow collision with the incoming fluid from inlet 18 and entrance 20.

A vortex finder tube generally indicated at 24 is removably mounted on upper body portion 14 at threaded connection 23 and extends downwardly within cylindrical chamber 22. The fluid stream entering chamber 22 is directed into a downwardly extending helical path by the curved surface or wall defining chamber 22. Vortex finder tube 24 has a central bore 26 defining an upper cylindrical bore portion 27 in fluid communication with an upper discharge outlet 28. Vortex finder tube 24 has a lower flared or bell-shaped end portion 29 which flares or tapers outwardly and defines a lower entrance orifice 30 for the inner vortex.

Mounted within central bore 26 of vortex finder tube 24 is a solid core generally indicated at 34 having an upper core potion 33 and a lower core portion 35 removably connected to upper core portion 33 at 37. Spider arms 36 extending from upper core portion 33 are secured to the inner peripheral surface of flared lower end portion 29 for mounting core 34 onto vortex finder tube 24. Core 34 has an outer peripheral surface 40 sloping or tapering inwardly from upper end 38 to a rounded lower end 43. The slope or taper of outer peripheral surface 40 increases at the lower tapered end portion 42 adjacent rounded lower end 43.

Figure 1:
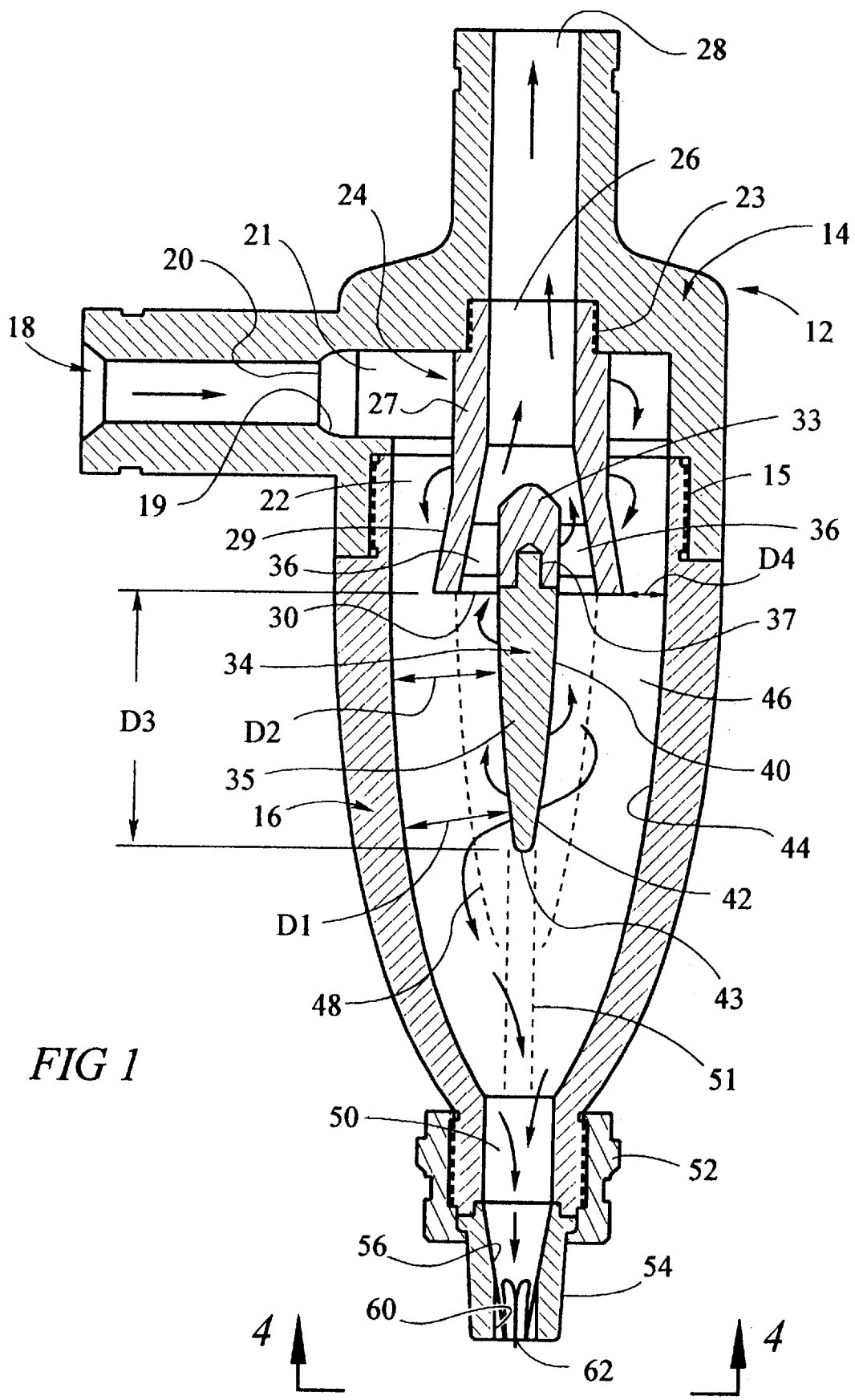
FIG. 1 is a longitudinal sectional view of the hydrocyclone separator of the present invention.

Lower body portion 16 has an inner parabolic or elliptical peripheral surface 44 which tapers inwardly from cylindrical chamber 22 generally in parallel relation to the outer peripheral surface 40 of core 34. Thus, the radial distances D1 and D2 as shown in FIG. 1 are substantially equal and a substantially equal area along the length of core 34 is provided in the annulus 46 defined between the outer peripheral surface 40 of core 34 and the inner peripheral surface 44 of lower body portion 16. By having annulus 46 of a substantially equal area along core 34, turbulence is minimized at an interface 48 formed between the downwardly moving outer vortex and the upwardly moving inner vortex. The bell-shaped lower end portion 29 of vortex finder tube 24 tends to direct the outer vortex toward inner peripheral surface 44 of lower body portion 16. This also tends to reduce intermingling of light gravity solids with heavier gravity solids. Core 34 extends downwardly a distance D3 from entrance orifice 30 of finder tube 24 about twice the inner diameter of flared end 29 of vortex finder tube 24. To be effective, distance D3 should be at least about 1½% times the inner diameter of flared end 29 in order to define a firm interface with minimal turbulence between the inner fluid vortex and outer fluid vortex. A restriction is shown at D4 at the lower end of flared end 29 of finder tube 24 and the velocity of the downwardly moving slurry is increased at restriction D4 which provide a venturi effect.

Annulus 46 below restriction D4 has a width D2 which is preferably about twice the width of restriction D4 for best results. A width D2 between about 1½ and 3 times the width of restriction D4 would function in a satisfactory manner.

Figure 4:
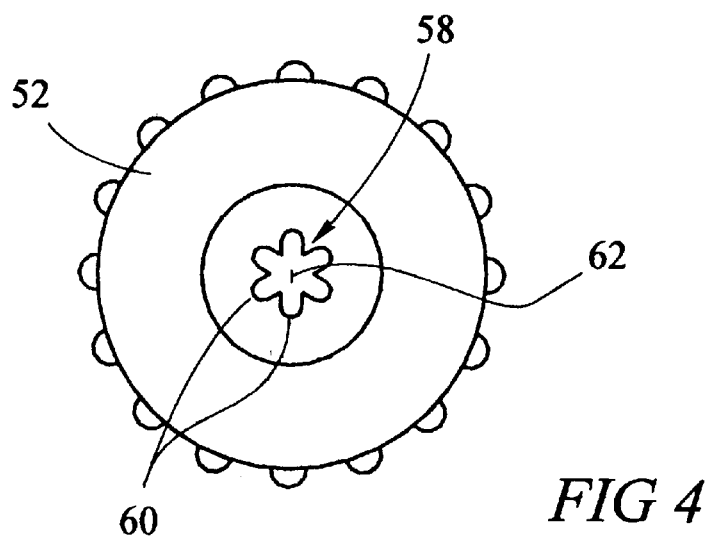
FIG. 4 is a bottom plan view taken generally along line 4—4 of FIG. 1.
Figure 3:
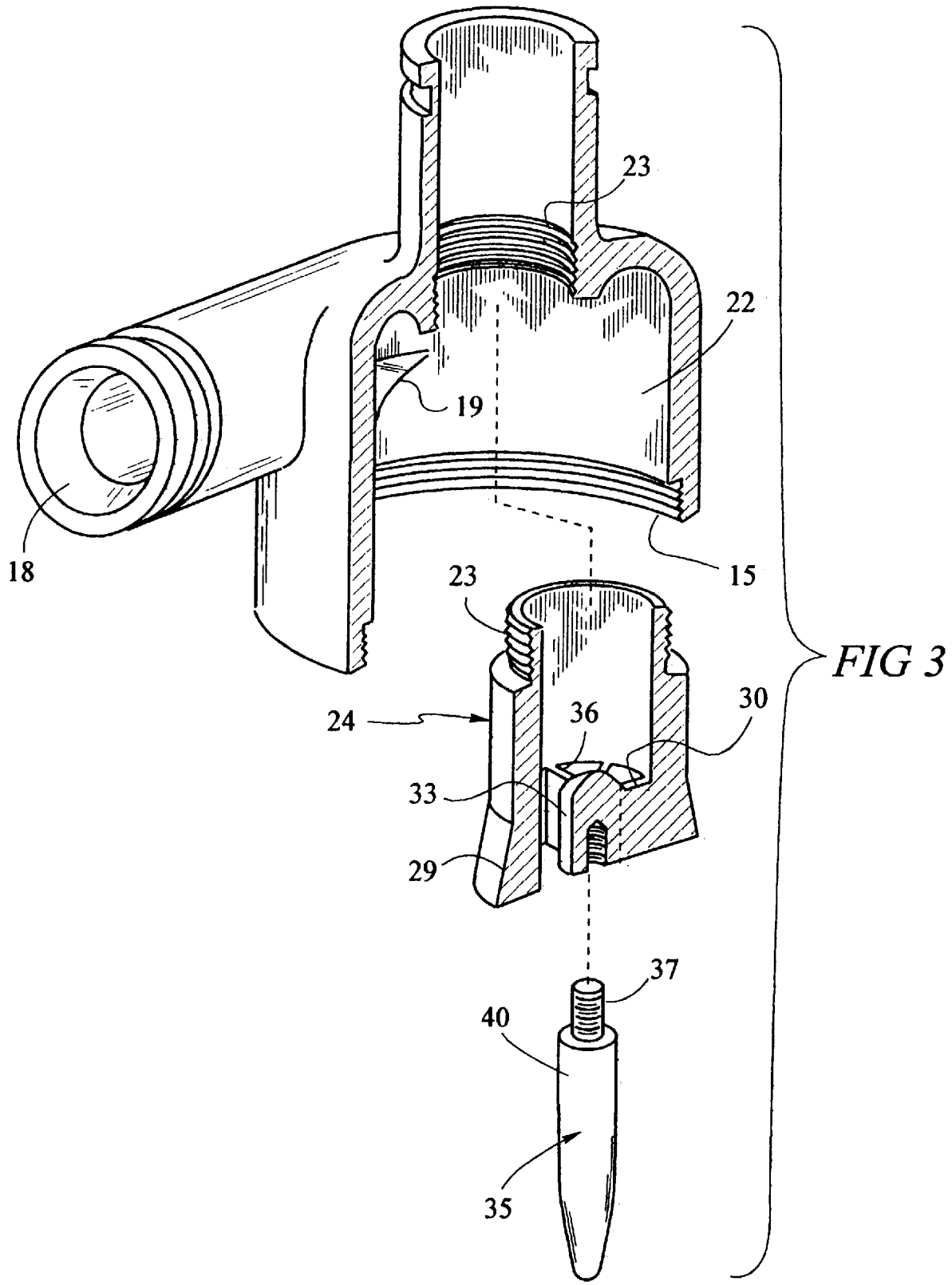
FIG. 3 is a perspective of the upper body portion shown in an exploded relation.

As shown in FIG. 4, lower body portion 16 has a lower outlet 50 and an internally threaded nut 52 secures a nozzle generally indicated at 54 thereon. A generally cylindrical hollow vortex or air core shown at 51 extends from outlet 50 to the end 43 of core 34. Nozzle 54 has a tapered upper bore 56 and a small diameter lower nozzle end port 58 having a plurality of radially extending lobes or openings 60 projecting outwardly from a central region 62. For further details, reference is made to U.S. Pat. No. 5,775,446 dated Jul. 7, 1998, the entire disclosure being incorporated for all purposes.

Operation

In operation and use of the present invention, a slurry under 80 to 100 feet of head is pressurized at an operating pressure between 30 to 70 psi. The slurry contains solids of various densities and is fed at about 50 to 125 gallons per minute into inlet 18. A minimum pressure drop occurs. The outer vortex is formed by the inner peripheral arcuate surface 21 of upper cylindrical chamber 22 and the entrance fluid merges smoothly with the spinning outer vortex in upper cylindrical chamber 22 which is moving downwardly about vortex finder tube 24. The centrifugal force moves the more dense particles radially outwardly while the less dense particles move radially inwardly with the fluid medium. A fluid reversal occurs above outlet 50 generally along the longitudinal axis of housing 16 and the sloping inner surface of housing 16 directs the outer vortex inwardly. Core 34 influences the formation of air core 51 and the inner fluid vortex formed generally inwardly of the interface defined at 48. A firm interface 48 is formed between the outer vortex and inner vortex by the upwardly flowing inner vortex flow about core 34. The bell-shaped end portion 29 of vortex finder tube 24 increases the velocity of the slurry as it moves downwardly to minimize any short-circuiting at the lower end of the vortex finder tube 24.

Thus, interface 48 between the inner and outer vortices is a more defined interface than provided heretofore which reduces the tendency of undesired particles being drawn into a particular vortex. The components and dimensioning particularly as indicated by D1, D2, D3 and D4 cooperate to provide an improved performance efficiency.

While separator 10 has been illustrated in the drawings as extending in a vertical direction, it is understood that separator 10 may extend in a horizontal direction and the terms "upper" and "lower" are to be interpreted as covering the opposed ends of a horizontally extending separator. Also, while core 34 has been shown as fixed to vortex finder tube 24, core 34 may be removably connected to vortex finder tube 24 and different sizes and shapes of core 34 may be substituted as desired for various uses.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A hydrocyclone separator for separating fluid entrained solids into light and heavy components; said separator comprising:

an elongate outer housing having an upper generally cylindrical chamber, a lower inwardly sloping chamber, and an outlet at opposed upper and lower ends of said housing;

a laterally extending entrance opening to said generally cylindrical chamber;

a vortex finder tube extending along the longitudinal axis of said housing within said upper cylindrical chamber and axially aligned with the outlet at the upper end of said housing; said vortex finder tube having an outwardly flaring lower portion defining an entrance orifice for an inner upwardly moving fluid vortex; and an elongate solid core mounted within said vortex finder tube and extending downwardly from said entrance orifice; said solid core tapering from its upper end to its lower end and extending within the lower sloping chamber of said housing; said solid core having an outer periphery in generally parallel relation to the inner periphery of said lower sloping chamber to define an annulus between the solid core and said lower sloping chamber, the annulus having a substantially equal area along the length of the annulus thereby to minimize turbulence at an interface between a downwardly moving outer fluid vortex and an inwardly moving inner fluid vortex.

2. A hydrocyclone separator as set forth in claim 1 wherein a discharge nozzle is positioned at the outlet for the lower end of said housing, said nozzle having a discharge port defining a circular central region and radially extending lobes projecting from said circular central region in a radial direction.

3. A hydrocyclone separator as set forth in claim 1 wherein said outer housing includes an upper housing portion forming said cylindrical chamber and said laterally extending entrance opening, and a lower housing portion removably secured to said upper housing portion for defining said lower inwardly sloping chamber;

said vortex finder tube suspended from said upper housing portion and extending through said cylindrical chamber into said inwardly sloping chamber for a substantial distance.

4. A hydrocyclone separator as set forth in claim 1 wherein mounting means are provided for removably mounting said vortex finder tube on said outer housing to permit replacement of said vortex finder tube.

5. A hydrocyclone separator as set forth in claim 4 wherein mounting means are provided for removably mounting at least a portion of said solid core on said finder tube for replacement of said solid core.

6. A hydrocyclone separator as set forth in claim 1 wherein said lower inwardly sloping chamber commences generally adjacent the lower end of said finder tube.

7. A hydrocyclone separator as set forth in claim 1 wherein said laterally extending entrance opening is of a circular cross section which merges into a generally rectangular cross section for entering said upper cylindrical chamber to minimize turbulence between the inlet fluid and the fluid defining the outer vortex in said cylindrical chamber.

8. A hydrocyclone separator as set forth in claim 1 wherein said flaring lower end portion of said finder tube defines a restriction for the downwardly moving fluid, and said annulus defined below the structure has a width at about 1½ times the width of said restriction.

9. A hydrocyclone separator as set forth in claim 1 wherein said elongate solid core extends downwardly from the lower end of said finder tube a distance at least 1½% times the internal diameter of said entrance orifice.

10. A hydrocyclone separator for separating fluid entrained solids into light and heavy components; said separator comprising:

an elongate outer housing having an upper body portion and a lower body portion removably connected to said upper body portion, said upper body portion defining a generally cylindrical chamber and said lower body portion defining a lower inwardly sloping chamber;

an outlet at opposed upper and lower ends of said housing;

a laterally extending entrance opening to said generally cylindrical chamber;

a vortex finder tube removably connected to said upper body portion within said upper cylindrical chamber and axially aligned with the outlet at the upper end of said housing; said vortex finder tube having an outwardly flaring lower portion defining an entrance orifice for an inner upwardly moving fluid vortex; and an elongate solid core mounted within said vortex finder tube and extending downwardly from said entrance orifice a distance at least 1½ times the internal diameter of said entrance orifice.

11. A hydrocyclone separator as set forth in claim 10 wherein mounting means are provided for removably mounting said vortex finder tube on said outer housing to permit replacement of said vortex finder tube.

12. A hydrocyclone separator as set forth in claim 10 wherein said laterally extending entrance opening is of a circular cross section which merges into a generally rectangular cross section for entering said upper cylindrical chamber to minimize turbulence between the inlet fluid and the fluid defining the outer vortex in said cylindrical chamber.

13. A hydrocyclone separator as set forth in claim 10 wherein said flaring lower end portion of said finder tube defines a restriction for the downwardly moving fluid, and said annulus defined below the structure has a width at about 1½ times the width of said restriction.

14. A hydrocyclone separator as set forth in claim 10 wherein said elongate solid core extends downwardly from the lower end of said finder tube a distance at least 1½% times the internal diameter of said entrance orifice.

* * * * *